United States Patent
Whitehill et al.

(10) Patent No.: US 11,436,714 B2
(45) Date of Patent: Sep. 6, 2022

(54) METHOD AND APPARATUS FOR ESTIMATING EMOTIONAL QUALITY USING MACHINE LEARNING

(71) Applicants: WORCESTER POLYTECHNIC INSTITUTE, Worcester, MA (US); UNIVERSITY OF VIRGINIA PATENT FOUNDATION, Charlottesville, VA (US)

(72) Inventors: Jacob Whitehill, Cambridge, MA (US); Anand Ramakrishnan, Worcester, MA (US); Erin Ottmar, Paxton, MA (US); Jennifer LoCasale-Crouch, Charlottesville, VA (US)

(73) Assignees: Worcester Polytechnic Institute, Worcester, MA (US); University of Virginia Patent Foundation, Charlottesville, VA (US)

( * ) Notice: Subject to any disclaimer, the term of this patent is extended or adjusted under 35 U.S.C. 154(b) by 265 days.

(21) Appl. No.: 16/999,560

(22) Filed: Aug. 21, 2020

(65) Prior Publication Data
US 2021/0056676 A1 Feb. 25, 2021

Related U.S. Application Data

(60) Provisional application No. 62/891,030, filed on Aug. 23, 2019.

(51) Int. Cl.
G06K 9/62 (2022.01)
G06T 7/00 (2017.01)
(Continued)

(52) U.S. Cl.
CPC .......... *G06T 7/0002* (2013.01); *G06K 9/6256* (2013.01); *G06N 3/04* (2013.01); *G06N 3/08* (2013.01); *G06V 20/46* (2022.01); *G06V 20/49* (2022.01); *G06V 40/161* (2022.01); *G09B 19/00* (2013.01); *G10L 25/30* (2013.01);
(Continued)

(58) Field of Classification Search
CPC ......... G06T 7/0002; G06T 2207/10016; G06T 2207/20081; G06T 2207/20084; G06T 2207/30201; G06K 9/6256; G06K 9/6293; G06N 3/04; G06N 3/08; G06N 3/0445; G06V 20/46; G06V 20/49; G06V 40/161; G06V 10/82; G06V 20/41; G06V 20/52;
(Continued)

(56) References Cited

U.S. PATENT DOCUMENTS 9,666,088 B2 * 5/2017 Dalal ....................... G09B 5/02

* cited by examiner

*Primary Examiner* — Charlotte M Baker
(74) *Attorney, Agent, or Firm* — Duquette Law Group

(57) ABSTRACT

Embodiments of the innovation relate to an emotional quality estimation device comprising a controller having a memory and a processor, the controller configured to execute a training engine with labelled training data to train a neural network and generate a classroom analysis machine, the labelled training data including historical video data and an associated classroom quality score table; receive a classroom observation video from a classroom environment; execute the classroom analysis machine relative to the classroom observation video from the classroom environment to generate an emotional quality score relating to the emotional quality of the classroom environment; and output the emotional quality score for the classroom environment.

26 Claims, 7 Drawing Sheets

(51) Int. Cl.
   *G10L 25/63*   (2013.01)
   *G10L 25/30*   (2013.01)
   *G10L 25/57*   (2013.01)
   *G06N 3/08*    (2006.01)
   *G06N 3/04*    (2006.01)
   *G09B 19/00*   (2006.01)
   *G06V 20/40*   (2022.01)
   *G06V 40/16*   (2022.01)

(52) U.S. Cl.
   CPC ............... *G10L 25/57* (2013.01); *G10L 25/63* (2013.01); *G06T 2207/10016* (2013.01); *G06T 2207/20081* (2013.01); *G06T 2207/20084* (2013.01); *G06T 2207/30201* (2013.01)

(58) Field of Classification Search
   CPC ...... G06V 40/176; G09B 19/00; G10L 25/30; G10L 25/57; G10L 25/63
   USPC .......................................... 382/157; 600/301
   See application file for complete search history.

METHOD AND APPARATUS FOR ESTIMATING EMOTIONAL QUALITY USING MACHINE LEARNING

RELATED APPLICATIONS

This patent application claims the benefit of U.S. Provisional Application No. 62/891,030 filed on Aug. 23, 2019, entitled, "Method and Apparatus for Estimating Emotional Climate Using Automated Machine Learning," the contents and teachings of which are hereby incorporated by reference in their entirety.

GOVERNMENT FUNDING

This invention was made with government support under Grants #1822768 and #1551594 awarded by the National Science Foundation. The government has certain rights in the invention.

BACKGROUND

In society, the emotional climate of a given scenario can affect the well-being of the people involved. For example, in school classrooms, one of the most important variables that predict students' learning is the nature and quality of interactions between teachers and their students. To assess these interactions, one conventional observation protocol used in classroom settings is the Classroom Assessment Scoring System (CLASS) (Teachstone Training, LLC). CLASS utilizes human coders to score classroom observation videos to measure the quality of teacher-student interactions, including Positive Climate and Negative Climate.

SUMMARY

Conventional observation protocols can suffer from a variety of deficiencies. For instance, third-party assessment of classroom interactions between a teacher and students can raise issues with respect to data privacy. For example, classroom observation videos can show instances of relatively sensitive situations, such as in the case where a person becomes emotionally distressed. In certain cases, a child may start crying or screaming, or a teacher may occasionally become visibly frustrated in front of his/her classroom during the creation of the observation videos. In these types of cases, the subjects of the videos may not want to have their sensitive incidents available for scoring due to potential embarrassment.

In another instance, assessment of teacher-student classroom interactions can be limited due to the high labor involved in manual coding. Careful coding of classroom observation videos, whether with the CLASS or other protocols (e.g., Framework for Teaching, UTeach, etc.), is highly laborious and requires coders to undergo many weeks of training to properly score the classroom observation videos. As such, classroom observation feedback to teachers tends to be rare.

Additionally, how a system analyzes a school classroom for its emotional quality can depend significantly on the age group (pre-school, elementary, high school, university, etc.) and/or the cultural background of the participants involved. For example, the emotional quality of high school classrooms may depend much more on the language exchanges between students and teachers than a pre-school classroom where the children speak relatively little. As such, a single, conventional analysis machine may not work well for all populations of students.

By contrast to conventional interaction assessment tools, embodiments of the present innovation relate to a method and apparatus for estimating emotional quality using machine learning. In one arrangement, an emotional quality estimation device includes a machine learning-based training engine which is configured to generate a classroom analysis machine that can analyze classroom observation videos and automatically estimate the degree of emotional quality exhibited in the classroom. Output of the classroom analysis machine, which relates to the degree of emotional quality, correlates to a scoring metric or classroom quality score such as the Framework for Teaching or the CLASS; it may also predict students' observed downstream academic and/or sociobehavioral outcomes. Accordingly, the output can be used to measure the impact of educational interventions and to provide teachers automated feedback on the quality of the interactions within their classrooms. Teachers, administrators, and educational researchers can utilize the output from the emotional quality estimation device to improve measurement of the quality of classroom teaching, to provide teachers with more fine-grained and frequent professional development opportunities, and to improve accountability in schools.

In one arrangement, the classroom analysis machine generated by the machine learning-based training engine can be tailored to a particular population. For example, embodiments of the present innovation can utilize labeled training data for a population of interest and can generate the classroom analysis machine genera based upon this data. As such, the emotional quality of one type of classroom, such as a high school classroom, can be distinguished from a pre-school classroom.

In one arrangement, during operation of embodiments of the emotional quality estimation device, the end user can follow a particular process. First, an end-user collects videos and associated classroom quality scores for a selected population of students and provides this as training data to an emotional quality estimation device. Next, the emotional quality estimation device executes a training engine with the historical video data and utilizes machine learning to produce a classroom analysis machine for the selected population. Next, the emotional quality estimation device executes the classroom analysis machine on classroom observation video taken from any classroom of students from the specific population. As a result, the emotional quality estimation device can estimate the classroom emotional quality of the video it processes. Further, the emotional quality estimation device can output an emotional quality score, generated by the classroom analysis machine which can serve as a feedback signal to teachers, educational researchers, and administrators, for example. Further, this score can be provided as feedback to teachers and administrators.

Automated generation and use of a classroom analysis machine is faster, more efficient, and less expensive than the use of human coders to score classroom observation videos manually. Further, the emotional quality estimation device can provide teachers with more rapid and fine-grained feedback than a human coder can provide.

Embodiments of the innovation relate to an emotional quality estimation device comprising a controller having a memory and a processor, the controller configured to execute a training engine with labelled training data to train a neural network and generate a classroom analysis machine, the labelled training data including historical video data and an associated classroom quality score table; receive a classroom observation video from a classroom environment; execute the classroom analysis machine relative to the classroom observation video from the classroom environment to generate an emotional quality score relating to the emotional quality of the classroom environment; and output the emotional quality score for the classroom environment.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a method and apparatus for estimating emotional quality using machine learning. In one arrangement, an emotional quality estimation device includes a machine learning-based training engine which is configured to generate a classroom analysis machine that can analyze classroom observation videos and estimate the degree of emotional quality exhibited in the classroom. Output of the emotional quality estimation device, which relates to the degree of emotional quality, correlates to a scoring metric or classroom quality score. Accordingly, the output can be used to measure the impact of educational inventions and to provide teachers automated feedback on the quality of the interactions within their classrooms. Teachers, administrators, and educational researchers can utilize the output from the emotional quality estimation device to improve measurement of the quality of classroom teaching, to provide teachers with more fine-grained and frequent professional development opportunities, and to improve accountability in schools.

Figure 1:
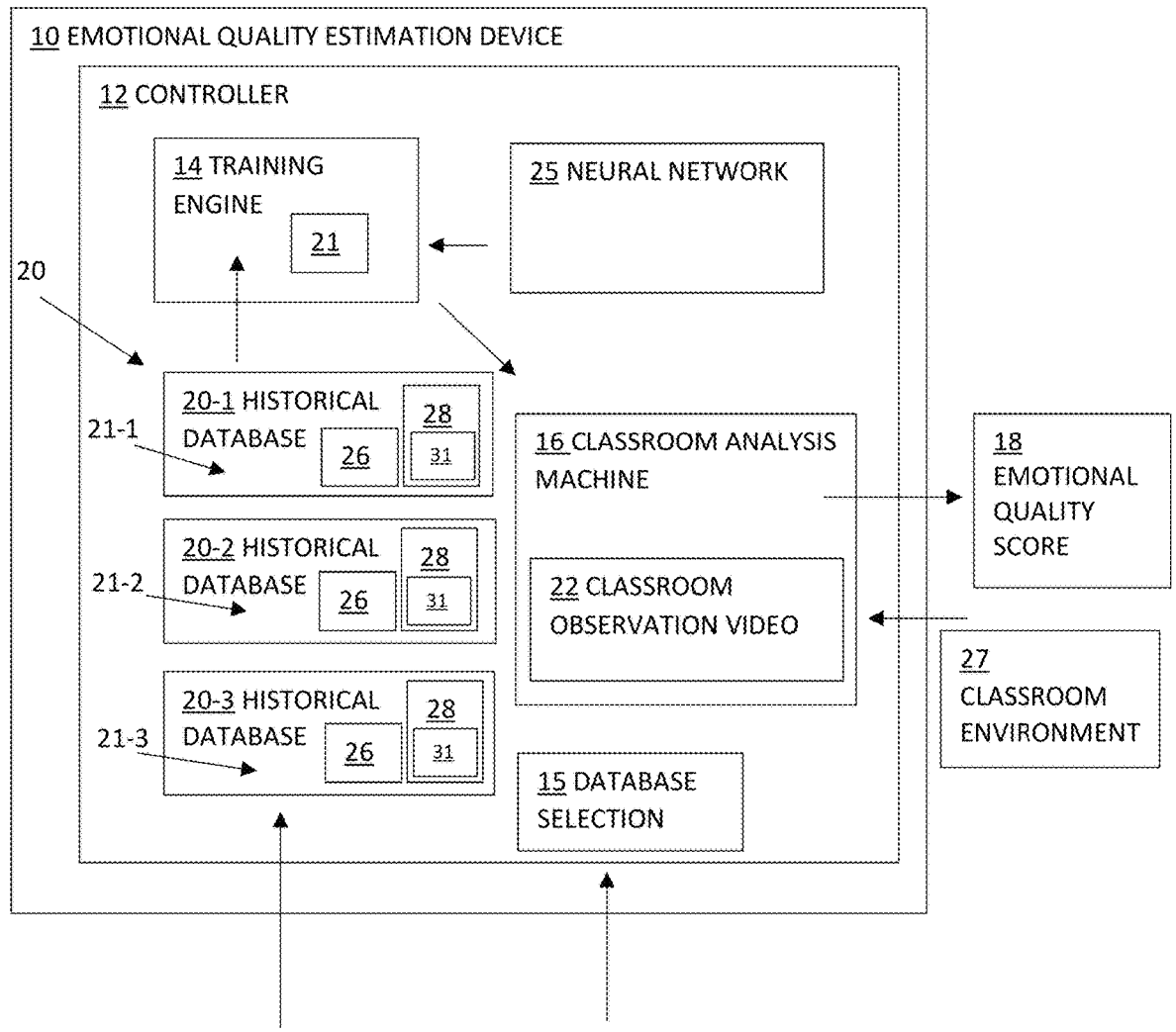
FIG. 1 illustrates an emotional quality estimation device, according to one arrangement.

FIG. 1 illustrates an emotional quality estimation device 10, herein estimation device, according to one embodiment. The estimation device 10 is configured to estimate and characterize the quality of an instructor's classroom interactions with his or her students. For example, the estimation device 10 includes a controller 12, such as a processor and memory, which includes a training engine 14 which can be configured as a graded descent algorithm. As will be described below, the controller 12 is configured to execute the training engine 14 on labelled video data 21 from a historical database 20 to train a neural network 25 and generate a classroom analysis machine 16. The classroom analysis machine 16, in turn, is configured to analyze classroom observation videos for a particular classroom and estimate the degree of emotional quality exhibited therein.

In one arrangement, the historical database 20 includes, as the labelled training data 21, historical video or image data 26 and a classroom quality score table 28 associated with the historical video data 26. The classroom quality score table 28 for an associated historical video data 26 is content agnostic and can be generated by a trained user based upon a review the historical video data 26. For example, the trained user can view the historical video data 26, can subdivide the historical video data 26 into segments of a given duration, and can assign one or more classroom quality scores for each video segment. In one arrangement, in the case where the trained user utilizes the Classroom Assessment Scoring System (CLASS) as the video assessment tool, the trained user can assign a classroom quality score for each of the dimensions of the CLASS—, including positive climate and negative climate, to each video segment and can store the classroom quality scores as part of the classroom quality score table 28. At the conclusion of the scoring process, the trained user can store the historical video data 26 and associated classroom quality score table 28 as labelled video data 21 to the historical database 20.

In one arrangement, the estimation device 10 can import the historical database 20 into the controller 12 from an external source, such as via a wireless or wired connection. Alternately, the estimation device 10 can be preconfigured with one or more historical databases 20 for use by the estimation device 10 when executing the training engine 14.

In one arrangement, the historical database 20 can be configured as a variety of historical databases 20, where each database includes labelled training data 21 for a given classroom grade level, such as for preschool, primary education students (e.g., grades 1-6), and/or secondary education students (e.g., grades 7-12). For example, the historical database 20 can include a first database 20-1 of labelled training data 21-1 for students in grades 1-4, a second database 20-2 of labelled training data 21-2 for students in grades 5-8, and a third database 20-3 of labelled training data 21-3 for students in grades 9-12. Additional historical databases 20 can be included for other classroom grade levels, such as for collegiate, graduate, and post-graduate students in a variety of academic disciplines.

In one arrangement, because the analysis of a school classroom for its emotional quality can depend upon the age group and/or the cultural background of the participants involved, the estimation device 10 can be configured to access a particular historical database 20 to generate a classroom analysis machine 16 tailored for a particular group/cultural background. For example, the estimation device 10 is configured to receive a database selection 15 which identifies a classroom grade level criterion (e.g., grade 5 classroom, grade 6 classroom, etc.) of a classroom environment to be analyzed. Based upon the database selection 15, the estimation device 10 can utilize a corresponding historical database 20 when executing the training engine 14 to train a neural network 25. For example, assume the case where the database selection 15 indicates that the estimation device 10 is to be used to analyze classroom observation videos for a fourth grade classroom. Here, the estimation device 10 can select the historical database 20-1 having labelled training data 21-1 for students in fourth grade and can use that data 21-1 when executing the training engine 14 to train the neural network 25.

By executing the training engine 14 on particular labelled training data 21 for a given student group to train the neural network 25, the estimation device 10 can generate a customized classroom analysis machine 16. The estimation device 10 which can be utilized to predict the degree of emotional quality exhibited for the classroom grade level criterion of a classroom environment 27. Specifically, the estimation device 10 can execute the classroom analysis machine 16 relative to a classroom observation video 22 from the classroom environment 27 to generate an emotional quality score 18 relating to the emotional quality of the classroom environment 27.

For example, during operation, the estimation device 10 can receive a classroom observation video 22 from a classroom environment 27, such as video data recorded from the particular classroom or video data streamed from the classroom in real time. The classroom observation video 22 can provide a visual and auditory indication of the interactions among the teacher and students in a classroom environment. When the classroom analysis machine 16 receives the classroom observation video 22, the estimation device 10 is configured to execute the trained classroom analysis machine 16 relative to the classroom observation video 22 to generate the emotional quality score 18 associated with the source classroom environment 27. For example, the classroom analysis machine 16 can be configured to identify a video, audio, or facial characteristic of the classroom observation video 22 (e.g., the number of faces contained within a set of frames of the video 22 the age associated with the faces, the emotion associated with the faces, where the faces are located, how the faces interact with each other, and/or audio related to the interactions, etc.).

Based upon such identification, the classroom analysis machine 16 can generate and output an emotional quality score 18, such as via a monitor or an electronic file, which predicts the emotional quality of the classroom environment 27. The emotional quality score 18 can be configured in a variety of ways. For example, the emotional quality score 18 can be configured as a notification or report and can be provided to the classroom teacher which indicates the quality of the interactions within their classrooms. Alternately, the emotional quality score 18 can include suggestions to the teacher to improve the predicted emotional quality of the classroom.

As provided above, during a training procedure, the controller 12 executes the training engine 14 with the labelled training data 21 from a selected historical database 20 to train a neural network 25 and generate the classroom analysis machine 16. The training procedure can be conducted in a variety of ways, examples of which are provided below.

Figure 2:
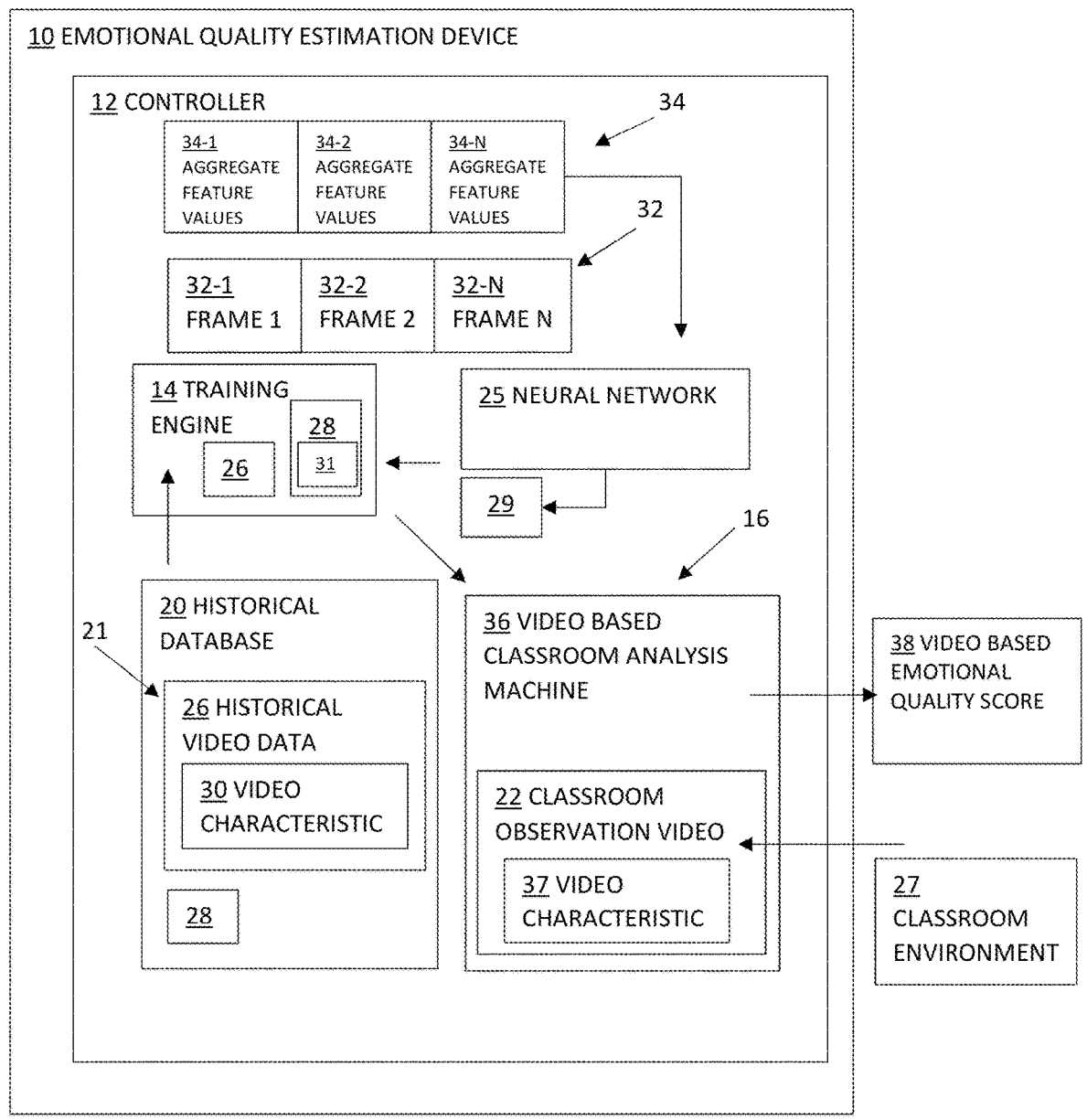
FIG. 2 illustrates an emotional quality estimation device configured to generate a video based classroom analysis machine, according to one arrangement.

In one example, with reference to FIG. 2, the training engine 14 is configured generate a video based classroom analysis machine 36 based upon a video characteristic 30 of the labelled training data 21. For example, the training engine 14 is configured to receive the labelled training data 21 and to divide the historical video data 26 of the labelled training data into a series of frames 32, such as frames 32-1 through 32-N. The training engine 14 is configured generate aggregate feature values 34 for each frame 32-1 through 32-N of the series of frames 32. For example, the training engine 14 can examine pixel values for each frame 32, perform a non-linear transform on the pixel values, and create multiple feature values 34-1 through 34-N for each frame 32 based upon the non-linear transform.

The training engine 14 is configured to then provide the aggregate feature values 34 to the neural network 25 to generate an estimated classroom quality score for a set of frames 32. For example, assume the case where the classroom quality score table 28 from the historical database 20 provides classroom quality scores corresponding to every ten minutes of historical video data 26. In such a case, the training engine 14 provides the aggregate feature values 34 for the frames 32 corresponding to every ten minutes of historical video data 26 to the neural network 25. As a result of the application, the neural network 25 can generate an estimated classroom quality score 29 for each ten minute set of frames 32.

The training engine 14 is configured to then compare the estimated classroom quality score 29 for that set of frames 32 with corresponding the classroom quality score 31 provided by the classroom quality score table 28. In the case where the estimated classroom quality score 29 is not equal to the classroom quality score 31, using machine learning techniques, the training engine 14 can adjust the weighs of aspects the neural network 25. The training engine 14 is configured to then repeat the process of providing the aggregate feature values 34 to the neural network 25, generating the estimated classroom quality score 29 and comparing the estimated classroom quality score 29 to the classroom quality score 31.

When the output of the neutral network 25 (e.g., the estimated classroom quality score 29) approaches a classroom quality score 31 of the classroom quality score table 28, such as a user-desired or selected level of accuracy, the training engine 14 is configured to output the neutral network 25 as a video based classroom analysis machine 36. The emotional quality estimation device 10 can then execute the video based classroom analysis machine 36 relative to a video characteristic 37 of a classroom observation video 22 to generate a video based emotional quality score 38 related to a given classroom environment 27.

In one arrangement, when analyzing the classroom observation video 22, the video based classroom analysis machine 36 is configured to perform the steps executed by the training engine 14 when generating the estimated classroom quality score 29. For example, the video based classroom analysis machine 36 can divide the classroom observation video 22 into a series of frames and generate a pixel value for each frame of the series of frames, such as an average pixel value per frame. The video based classroom analysis machine 36 is configured to then generate the video based emotional quality score 38 for a set of frames based upon the pixel values. The video based emotional quality score 38 provides a relatively accurate predictor of the emotional quality (e.g., positive or negative) of the classroom based upon the video portion of the classroom observation video 22.

Figure 3:
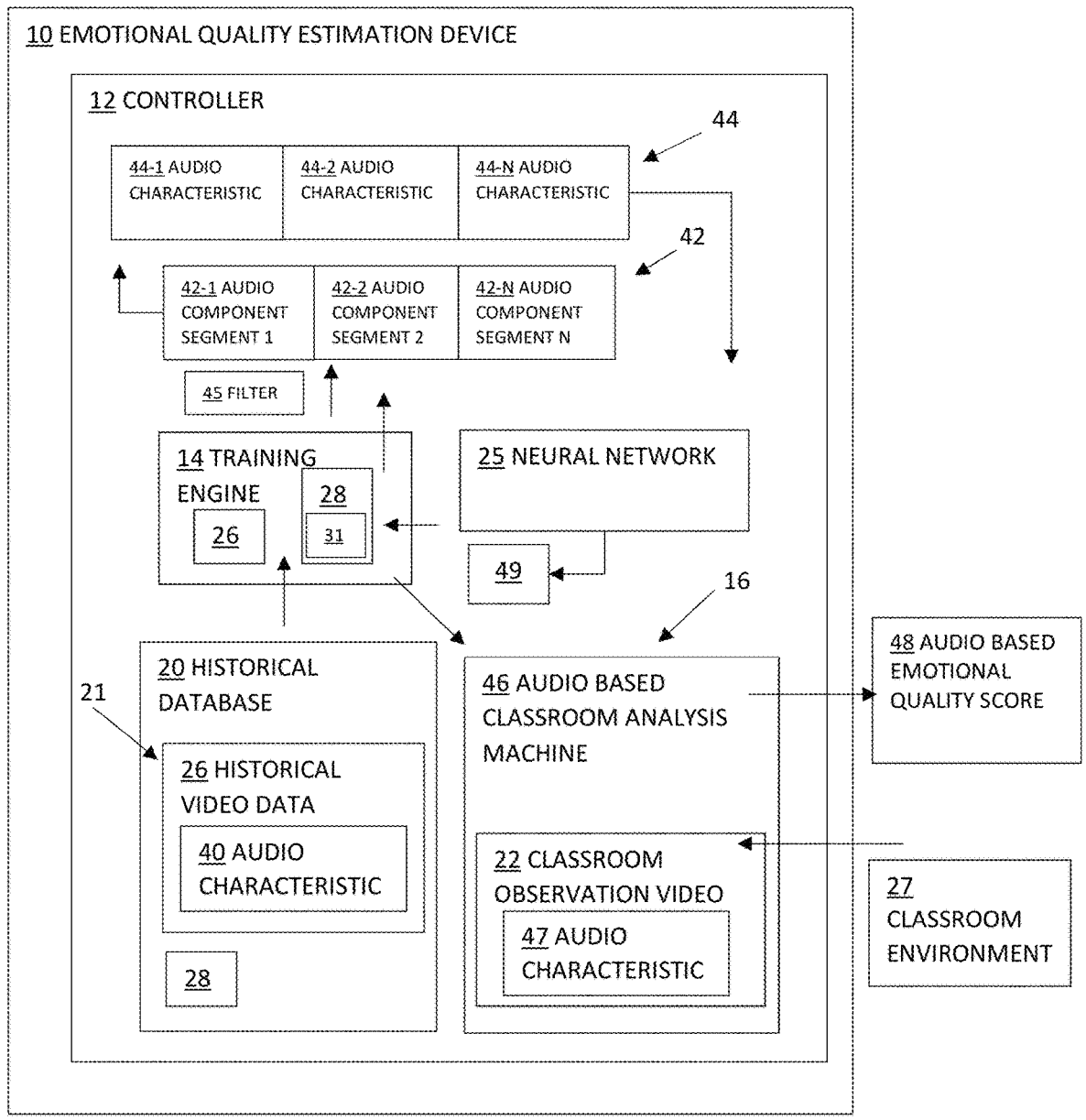
FIG. 3 illustrates an emotional quality estimation device configured to generate an audio based classroom analysis machine, according to one arrangement

In another example, with reference to FIG. 3, the training engine 14 is configured generate the classroom analysis machine 16 based upon an audio characteristic 40 of the labelled training data 21. For example, the training engine 14 is configured to receive the labelled training data 21 and to extract an audio component from the historical video data 26. For example, the training engine 14 is configured to extract Chroma and Mel-Frequency Cepstral Coefficients (MFCCs) as the audio components from the historical video data 26. The training engine 14 is then configured to divide the audio component into a sequence of segments 42-1 through 42-N and apply a filter 45 to each segment to define corresponding audio characteristic 44-1 through 44-N for each audio component segment 42-1 through 42-N. For example, the filter 45 can identify increasing or decreasing frequencies within a segment 42 or between adjacent segments 42.

The training device 14 is configured to then provide the audio characteristics 44 for each segment 42 to the neural network 25 to generate an estimated classroom quality score 49 for the audio component segments 42. For example, the training device 14 can utilize the neural network 25 to identify patterns that are predictive of emotional quality in the classroom. The training engine 14 can utilize a variety of neural network 25 when generating the classroom analysis machine 16 for an audio characteristic 40. For example, the training engine 14 can utilize ResNet followed by a bidirectional LSTM as the neural network 25.

The training engine 14 is configured to then compare the estimated classroom quality score 49 for the audio component segments 42 with corresponding the classroom quality score 31 provided by the classroom quality score table 28. In the case where the estimated classroom quality score 49 is not equal to the classroom quality score 31, using machine learning techniques, the training engine 14 can adjust the weighs of aspects the neural network 25. The training engine 14 is configured to then repeat the process of providing the audio component segments 42 to the neural network 25, generating the estimated classroom quality score 49 and comparing the estimated classroom quality score 49 to the classroom quality score 31.

When the output of the neutral network 25 (e.g., the estimated classroom quality score 49) approaches a classroom quality score 31 of the classroom quality score table 28, the training engine 14 is configured to output the neutral network 25 as an audio based classroom analysis machine 46. The emotional quality estimation device 10 can then execute the audio based classroom analysis machine 46 relative to an audio characteristic 47 of a classroom observation video 22 to generate an audio based emotional quality score 48 related to a given classroom environment 27.

In one arrangement, when analyzing the classroom observation video 22, the audio based classroom analysis machine 46 is configured to perform the steps executed by the training engine 14 when generating the estimated classroom quality score 49. For example, the audio based classroom analysis machine 46 can extract an audio component from the classroom observation video 22, divide the audio component into a sequence of segments, and apply a filter to each segment to define corresponding audio characteristic for each segment. The audio based classroom analysis machine 46 is configured to then generate the audio based emotional quality score 48 for the segments based upon the audio characteristic for each segment. The audio based emotional quality score 48 provides a relatively accurate predictor of the emotional quality (e.g., positive or negative) of the classroom based upon the audio portion of the classroom observation video 22.

Figure 4:
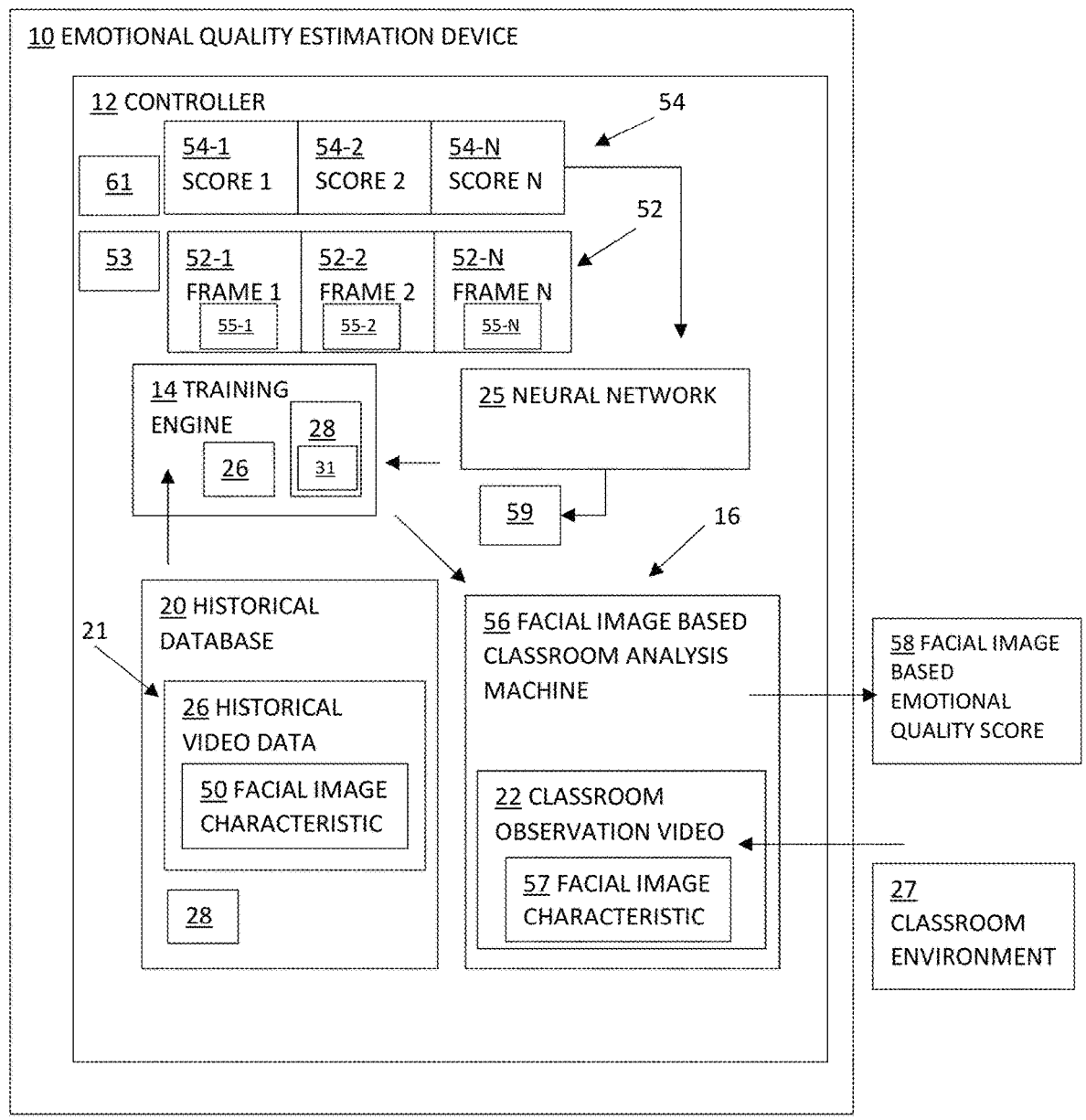
FIG. 4 illustrates an emotional quality estimation device configured to generate a facial image based classroom analysis machine, according to one arrangement

In another example, with reference to FIG. 4, the training engine 14 is configured generate the classroom analysis machine 16 based upon a facial characteristic 50 of the labelled training data 21. For example, the training engine 14 is configured to receive the labelled training data 21 and to divide the historical video data 26 of the labelled training data into a series of frames 52, such as frames 52-1 through 52-N. The training engine 14 is configured identify a facial image 55-1 through 55-N for each frame 52-1 through 52-N of the series of frames 52. For example, the training engine 14 can utilize face detection engine 53 to detect the presence of facial images 55 in each frame 52-1 through 52-N.

Following detection of one or more facial images 55 in each frame 52, the training engine 14 is configured to assign a facial image emotional score 54-1 through 54-4 to each facial image 55-1 through 55-N for each frame 52-1 through 52-N. For example, for each facial image 55 per frame 52 detected, the training engine 14 is configure to utilize an emotional classification engine 61 to classify the emotion of each facial image 55, such as anger, sadness, and joy, and to provide that emotion with a corresponding facial image emotional score 54.

The training engine 14 is configured to then provide the facial image emotional scores 54 to the neural network 25 to generate an estimated classroom quality score 59 for a set of frames 32. For example, assume the case where the classroom quality score table 28 from the historical database 20 provides classroom quality scores corresponding to every ten frames of historical video data 26. In such a case, the training engine 14 provides the facial image emotional score 54 for ten frames 52 of historical video data 26 to the neural network 25. As a result of the application, the neural network 25 can generate an estimated classroom quality score 59 for every ten frames 52 of the historical video data 26.

The training engine 14 is configured to then compare the estimated classroom quality score 59 for that set of frames 32 with a corresponding classroom quality score 31 provided by the classroom quality score table 28. In the case where the estimated classroom quality score 59 is not equal to the classroom quality score 31, using machine learning techniques, the training engine 14 can adjust the weights of aspects the neural network 25. The training engine 14 is configured to then repeat the process of providing the facial image emotional score 54 to the neural network 25, generating the estimated classroom quality score 59 and comparing the estimated classroom quality score 59 to the classroom quality score 31.

When the output of the neutral network 25 (e.g., the estimated classroom quality score 59) approaches the classroom quality score 31 of the classroom quality score table 28, the training engine 14 is configured to output the neutral network 25 as a facial image based classroom analysis machine 56. The emotional quality estimation device 10 can then execute the facial image based classroom analysis machine 56 relative to a facial image characteristic 57 of a classroom observation video 22 to generate a facial image based emotional quality score 58 related to a given classroom environment 27.

In one arrangement, when analyzing the classroom observation video 22, the facial image based classroom analysis machine 56 is configured to perform the steps executed by the training engine 14 when generating the estimated classroom quality score 59. For example, the facial image based classroom analysis machine 56 can divide the classroom observation video 22 into a series of frames, identify a facial image for each frame, and can utilize a face detection engine to detect the presence of facial images contained in each frame, as well as other features (e.g., the age associated with the faces, where the faces are located, how the faces interact with each other, etc.). The facial image based classroom analysis machine 56 is configured to then classify the emotion of each facial image and to generate a corresponding facial image emotional score for each frame. The facial image based classroom analysis machine 56 is configured to generate the facial image characteristic quality score 58 for the set of frames based upon the facial image emotional scores for the frames in the set. The facial image based emotional quality score 58 provides a relatively accurate predictor of the emotional quality (e.g., positive or negative)

of the classroom based upon the facial image portion of the classroom observation video 22.

As described above, the training engine 14 of the emotional quality estimation device 10 is configured to generate a video based classroom analysis machine 36, an audio based classroom analysis machine 46, or a facial image based classroom analysis machine 56. Such description is by way of example only. In one arrangement, the training engine 14 can generate any combination, or all, of the video based, audio based and facial image based classroom analysis machines 36, 46, 56 to generate corresponding emotional quality scores 38, 48, 58 for a classroom. Further, the emotional quality estimation device 10 can be configured to combine at least two of the video based, the audio based, and the facial image based emotional quality scores 38, 48, 58 to generate a composite emotional quality score 62 as the emotional quality score.

Figure 5:
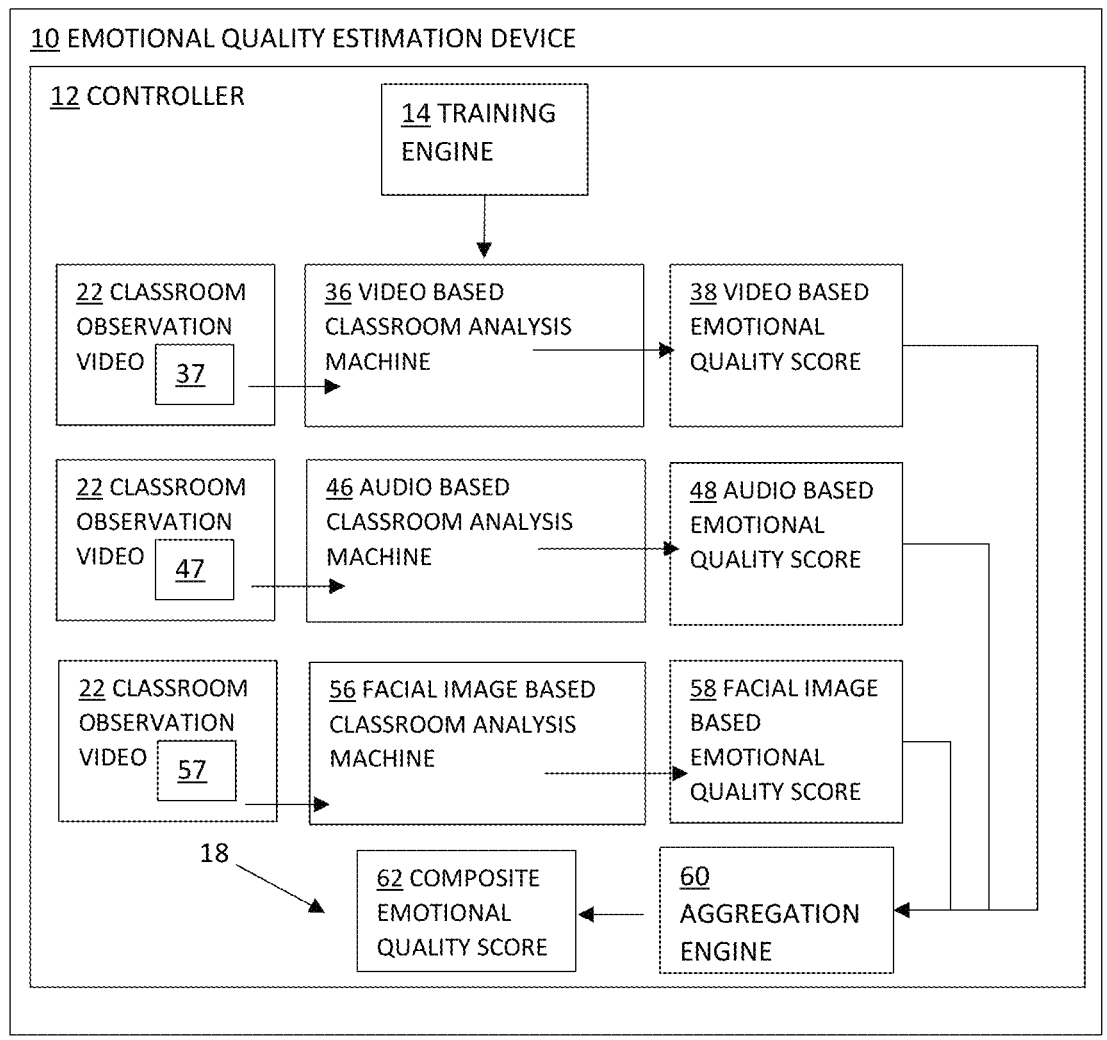
FIG. 5 illustrates an emotional quality estimation device configured to utilize two or more particular emotional quality scores to generate an aggregate emotional quality score.

For example with reference to FIG. 5, the training engine 14 of the emotional quality estimation device 10 is configured to generate a video based, audio based and facial image based classroom analysis machine 36, 46, 56. Each analysis machine 36, 46, 56 can generate a corresponding emotional quality scores 38, 48, 58 for a classroom based upon an inputted classroom observation video 22. Following generation of the scores 38, 48, 58, the emotional quality estimation device 10 can execute an aggregation engine 60 combine at least two of the scores 38, 48, 58 to generate and output a composite emotional quality score 62 as the emotional quality score 18. For example, the aggregation engine 60 can combine the video and audio characteristic scores 38, 48, the video and facial image characteristic scores 38, 58, the audio and facial image characteristic scores 48, 58, or all three scores 38, 48, 58 either as an equally-weighted average or as a weighted average. The resulting composite emotional quality score 62. Such combination can increase the accuracy of the emotional quality score 18 in predicting the emotional quality (e.g., positive or negative) of the classroom shown in the classroom observation video 22.

As provided above, the emotional quality estimation device 10 is configured to receive a classroom observation video 22 from a classroom environment 27 which identifies the interactions among a teacher and one or more students. For example, an hour-long classroom observation video 22 can include one or more instances indicating a relatively-positive emotional interaction and one or more instances indicating a relatively-negative emotional interaction. These specific instances can be important to provide back to the classroom teacher to encourage similar positive interactions and discourage similar negative interactions. However, the classroom observation video 22 can be, in certain cases, relatively lengthy. As such, while the classroom observation video 22 can include portions of video and/or audio which can be considered relatively important to the emotional quality of the classroom environment 27, manual identification of these portions can be time consuming. In one arrangement, the classroom analysis machine 16 is configured to identify these relatively-positive and/or relatively-negative emotional interactions as a key element of the classroom observation video 22.

Figure 6:
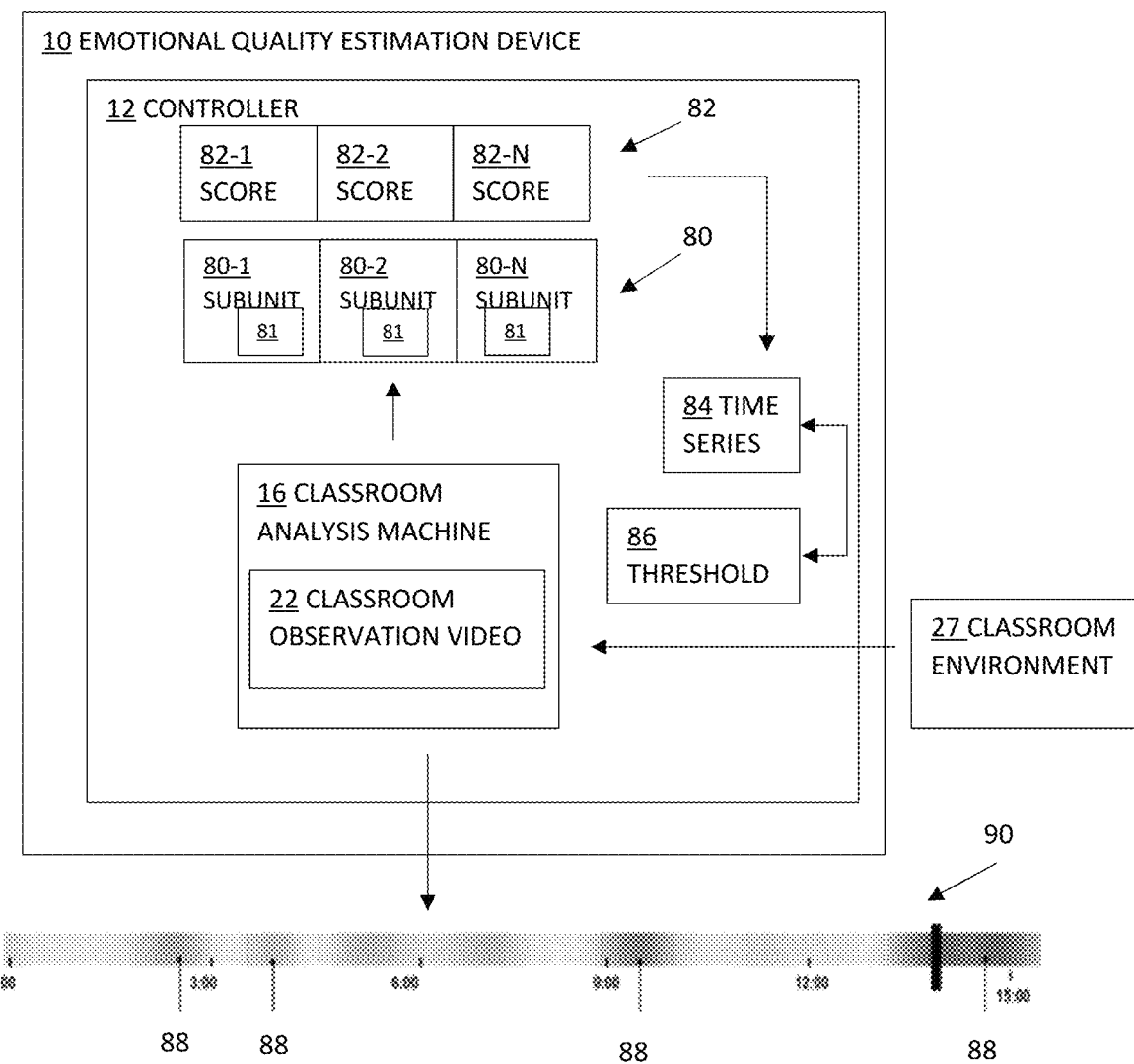
FIG. 6 illustrates the classroom analysis machine detecting a key event, according to one arrangement.

For example, with reference to FIG. 6, the classroom analysis machine 16 is configured to access the classroom observation video 22 and divide the classroom observation video 22 into subunits 80, each subunit 80 having an associated time value 81, such as units having a duration of one minute in length. While the subunits 80 can be serial in nature (e.g., divided in consecutive one minute increments), in one arrangement, the subunits 80 can overlap in time. The classroom analysis machine 16 is configured to then generate a subunit quality score 82 for each subunit based upon at least one of a video characteristic, audio characteristic, or facial image characteristic associated with the subunit, such as described above. For example, execution of the classroom analysis machine 16 can generate a subunit quality score 82 for each subunit 80 with a value between 0 and 1.

Following generation of the subunit quality scores 82, the classroom analysis machine 16 can be configured to then generate a one-dimensional time series 84 of subunit quality scores 82 for the entire classroom observation video 22. For example, the classroom analysis machine 16 can arrange the subunit quality scores 82 in increasing time order according to the time value of each subunit 80. Further, the classroom analysis machine 16 can be configured to then compare the subunit quality scores 82 of the one-dimensional time series 82 to a threshold value 84 to identify the points in time of the classroom observation video 22 where key elements occur. For example, assume the case where a threshold value 84 of 0.5 or greater indicates a relatively-positive emotional interaction, and a key element, of the classroom observation video 22. As the classroom analysis machine 16 compares the one-dimensional time series 82 to the threshold value 86, the classroom analysis machine 16 can identify at least one series of subunits 80 as relating to a key element 88 when a corresponding set of one-dimensional time series 84 of subunit quality scores 82 meets or exceeds the threshold value 86. For example, the classroom analysis machine 16 can identify a series of subunits 80 as relating to a key element 88 when the subunit quality scores 82 associated with those subunits 80 is 0.5 or greater. As a result of the comparison, in one arrangement, the classroom analysis machine 16 can generate and output the one-dimensional time series 84 of subunit quality scores 82 as a heat map 90 which identifies the series of subunits 80 having a subunit quality score 82 of 0.5 or greater as hot spots (e.g., locations in the classroom observation video 22 having key elements 88) on the heat map 90.

Figure 7:
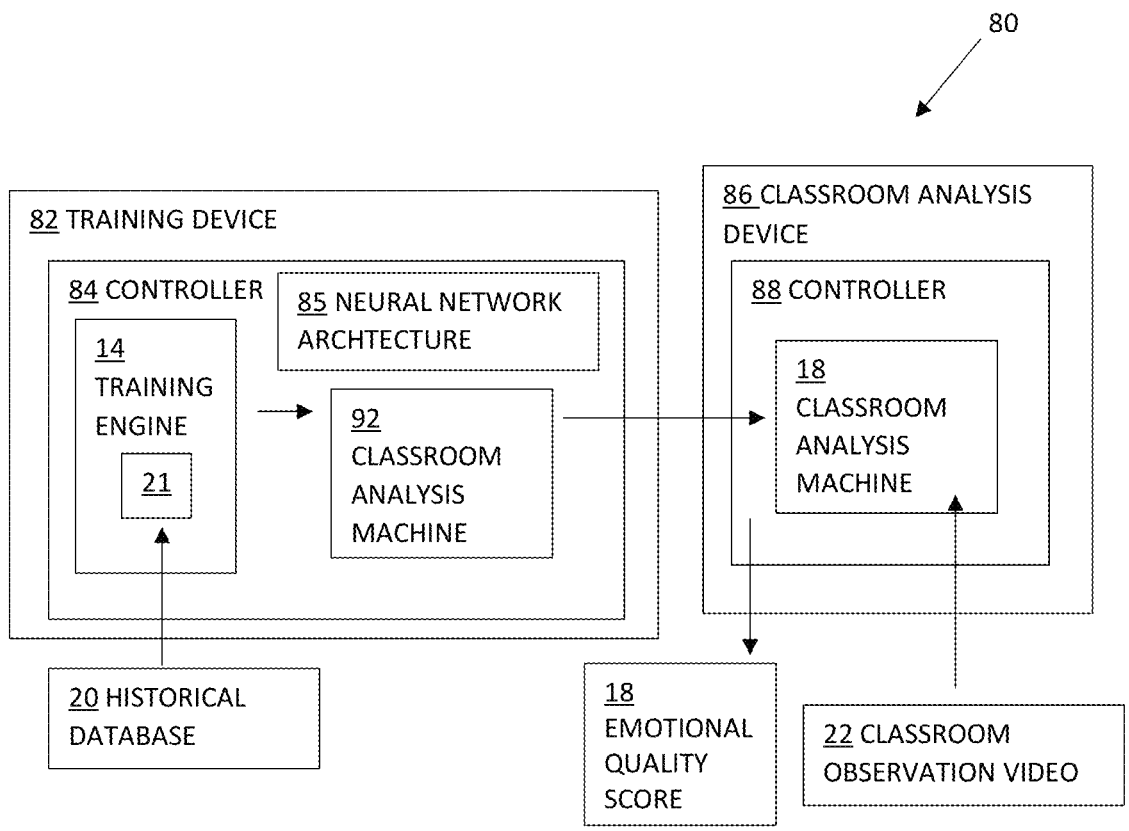
FIG. 7 illustrates an emotional quality estimation system, according to one arrangement.

As described above, the emotional quality estimation device 10 is configured as a single device which includes the training engine 14 and the resulting classroom analysis machine 16. Such description is by way of example only. In one arrangement, as illustrated in FIG. 7, the training engine 14 and the classroom analysis machine 16 can be embodied in separate devices which interact to form an emotional quality estimation system 80. For example, the emotional quality estimation system 80 includes a training device 82 having a controller 84, such as a memory and a processor, and a classroom analysis device 86 having a controller 88, such as a memory and a processor. The controller 84 of the training device 82 is configured to receive labelled training data 21 from a database 20 and to execute the training engine 14 on the labelled video data 21 to train a neural network 85 and generate a classroom analysis machine 85. The training device 42 can then provide the classroom analysis machine 85 to the classroom analysis device 86, such as via a wireless or wired communication channel.

During operation, once the classroom analysis device 86 receives classroom observation video 22, the classroom analysis machine 86 can execute the classroom analysis machine 16 to identify a video, audio, or facial characteristic of the classroom observation video 22 (e.g., the number of faces contained within a set of frames of the video 22, the age associated with the faces, the emotion associated with the faces, where the faces are located, how the faces interact with each other, and/or audio related to the interactions, etc.). Based upon such identification, the classroom analysis machine 86 can generate an emotional quality score 18 relating to a classroom and can output the emotional quality score 18, such as via a monitor or display or as an electronic file.

While various embodiments of the innovation have been particularly shown and described, it will be understood by those skilled in the art that various changes in form and details may be made therein without departing from the spirit and scope of the innovation as defined by the appended claims.

What is claimed is:

1. An emotional quality estimation device, comprising:
a controller having a memory and a processor, the controller configured to:
execute a training engine with labelled training data to train a neural network and generate a classroom analysis machine, the labelled training data including historical video data and an associated classroom quality score table;
receive a classroom observation video from a classroom environment;
execute the classroom analysis machine relative to the classroom observation video from the classroom environment to generate an emotional quality score relating to the emotional quality of the classroom environment; and
output the emotional quality score for the classroom environment.

2. The emotional quality estimation device of claim 1, wherein the controller is configured to:
receive a database selection which identifies classroom grade level criterion of a classroom environment to be analyzed; and
execute the training engine with the labelled training data from the historical database identified by the database selection to train the neural network and generate the classroom analysis machine for the classroom grade level criterion of the classroom environment.

3. The emotional quality estimation device of claim 1, wherein when executing the training engine the controller is configured to generate the classroom analysis machine based upon a video characteristic of the labelled training data.

4. The emotional quality estimation device of claim 3, wherein when generating the classroom analysis machine based upon the video characteristic of the labelled training data, the controller is configured to:
divide the historical video data of the labelled training data into a series of frames;
generate multiple feature values for each frame of the series of frames;
provide the multiple feature values for each frame of the series of frames to the neural network; and
when the output of the neutral network approaches a classroom quality score of the classroom quality score table, output the neutral network architecture as a video based classroom analysis machine.

5. The emotional quality estimation device of claim 4, wherein when executing the classroom analysis machine relative to the classroom observation video from the classroom environment to generate the emotional quality score relating to the emotional quality of the classroom environment, the controller is configured to execute the video based classroom analysis machine relative to a video characteristic of the classroom observation video from the classroom environment to generate a video based emotional quality score.

6. The emotional quality estimation device of claim 1, wherein when executing the training engine the controller is configured to generate the classroom analysis machine based upon an audio characteristic of the labelled training data.

7. The emotional quality estimation device of claim 6, wherein when generating the classroom analysis machine based upon the audio characteristic of the labelled training data, the controller is configured to:
extract an audio component from the historical video data;
divide the audio component into a sequence of segments;
apply a filter to each segment to define an audio characteristic for each segment;
provide the audio characteristic for each segment to the neural network; and
when the output of the neutral network approaches a classroom quality score of the classroom quality score table, output the neutral network as an audio based classroom analysis machine.

8. The emotional quality estimation device of claim 7, wherein when executing the classroom analysis machine relative to the classroom observation video from the classroom environment to generate the emotional quality score relating to the emotional quality of the classroom environment, the controller is configured to execute the audio based classroom analysis machine relative to an audio characteristic of the classroom observation video from the classroom environment to generate an audio based emotional quality score.

9. The emotional quality estimation device of claim 1, wherein when executing the training engine the controller is configured to generate the classroom analysis machine based upon a facial image characteristic of the labelled training data.

10. The emotional quality estimation device of claim 9, wherein when generating the classroom analysis machine based upon the video characteristic of the labelled training data, the controller is configured to:
divide the historical video data of the labelled training data into a series of frames;
identify a facial image for each frame of the series of frames;
assign a facial image emotional score to each facial image for each frame;
provide the facial image emotional score for each frame of the series of frames to the neural network; and
when the output of the neutral network approaches a classroom quality score of the classroom quality score table, output the neutral network as a facial image based classroom analysis machine.

11. The emotional quality estimation device of claim 10, wherein when executing the classroom analysis machine relative to the classroom observation video from the classroom environment to generate the emotional quality score relating to the emotional quality of the classroom environment, the controller is configured to execute the facial image based classroom analysis machine relative to a facial characteristic of the classroom observation video from the classroom environment to generate a facial image emotional quality score.

12. The emotional quality estimation device of claim 1, wherein:
when executing the classroom analysis machine relative to the classroom observation video from the classroom environment to generate the emotional quality score, the controller is configured to execute at least two of:

a video based classroom analysis machine relative to a video characteristic of the classroom observation video to generate a video based emotional quality score, an audio based classroom analysis machine relative to an audio characteristic of the classroom observation video to generate an audio based emotional quality score, and a facial image based classroom analysis machine relative to a facial characteristic of the classroom observation video to generate a facial image based emotional quality score; and when outputting the emotional quality score for the classroom environment, the controller is configured to combine at least two of the video based emotional quality score, the audio based emotional quality score, and the facial image based emotional quality score to generate a composite emotional quality score as the emotional quality score.

13. The emotional quality estimation device of claim 1, wherein when executing the classroom analysis machine relative to the classroom observation video from the classroom environment to generate an emotional quality score, the controller is further configured to:

divide the classroom observation video into subunits, each subunit having an associated time value;

generate a subunit quality score for each subunit based upon at least one of a video characteristic, an audio characteristic, and a facial image characteristic associated with the subunit;

generate a one-dimensional time series of subunit quality scores associated with the classroom observation video;

compare the one-dimensional time series of subunit quality scores with a threshold value; and identify at least one series of subunits as relating to a key element when a corresponding set of one-dimensional time series of subunit quality scores one of meets and exceeds the threshold value.

14. In an emotional quality estimation device, a method of estimating an emotional quality of a classroom environment, comprising:

executing a training engine with labelled training data to train a neural network and generate a classroom analysis machine, the labelled training data including historical video data and an associated classroom quality score table;

receiving a classroom observation video from a classroom environment;

executing the classroom analysis machine relative to the classroom observation video from the classroom environment to generate an emotional quality score relating to the emotional quality of the classroom environment; and outputting the emotional quality score for the classroom environment.

15. The method of claim 14, comprising:

receiving a database selection which identifies classroom grade level criterion of a classroom environment to be analyzed; and executing the training engine with the labelled training data from the historical database identified by the database selection to train the neural network and generate the classroom analysis machine for the classroom grade level criterion of the classroom environment.

16. The method of claim 14, wherein executing the training engine comprises generating the classroom analysis machine based upon a video characteristic of the labelled training data.

17. The method of claim 16, wherein generating the classroom analysis machine based upon the video characteristic of the labelled training data comprises:

dividing the historical video data of the labelled training data into a series of frames;

generating multiple feature values for each frame of the series of frames;

providing the multiple feature values for each frame of the series of frames to the neural network; and when the output of the neutral network approaches a classroom quality score of the classroom quality score table, outputting the neutral network architecture as a video based classroom analysis machine.

18. The method of claim 17, wherein executing the classroom analysis machine relative to the classroom observation video from the classroom environment to generate the emotional quality score relating to the emotional quality of the classroom environment comprises executing the video based classroom analysis machine relative to a video characteristic of the classroom observation video from the classroom environment to generate a video based emotional quality score.

19. The method of claim 14, wherein executing the training engine comprises generating the classroom analysis machine based upon an audio characteristic of the labelled training data.

20. The method of claim 19, wherein generating the classroom analysis machine based upon the audio characteristic of the labelled training data comprises:

extracting an audio component from the historical video data;

dividing the audio component into a sequence of segments;

applying a filter to each segment to define an audio characteristic for each segment;

providing the audio characteristic for each segment to the neural network; and when the output of the neutral network approaches a classroom quality score of the classroom quality score table, outputting the neutral network as an audio based classroom analysis machine.

21. The method of claim 20, wherein executing the classroom analysis machine relative to the classroom observation video from the classroom environment to generate the emotional quality score relating to the emotional quality of the classroom environment comprises executing the audio based classroom analysis machine relative to an audio characteristic of the classroom observation video from the classroom environment to generate an audio based emotional quality score.

22. The method of claim 1, wherein executing the training engine comprises generating the classroom analysis machine based upon a facial image characteristic of the labelled training data.

23. The method of claim 22, wherein generating the classroom analysis machine based upon the video characteristic of the labelled training data comprises:

dividing the historical video data of the labelled training data into a series of frames;

identifying a facial image for each frame of the series of frames;

assigning a facial image emotional score to each facial image for each frame;

providing the facial image emotional score for each frame of the series of frames to the neutral network; and when the output of the neutral network approaches a classroom quality score of the classroom quality score table, outputting the neutral network as a facial image based classroom analysis machine.

24. The method of claim 23, wherein executing the classroom analysis machine relative to the classroom observation video from the classroom environment to generate the emotional quality score relating to the emotional quality of the classroom environment comprises executing the facial image based classroom analysis machine relative to a facial characteristic of the classroom observation video from the classroom environment to generate a facial image emotional quality score.

25. The method of claim 14, wherein:

executing the classroom analysis machine relative to the classroom observation video from the classroom environment to generate the emotional quality score comprises executing at least two of:

a video based classroom analysis machine relative to a video characteristic of the classroom observation video to generate a video based emotional quality score, an audio based classroom analysis machine relative to an audio characteristic of the classroom observation video to generate an audio based emotional quality score, and a facial image based classroom analysis machine relative to a facial characteristic of the classroom observation video to generate a facial image based emotional quality score; and outputting the emotional quality score for the classroom environment comprises combining at least two of the video based emotional quality score, the audio based emotional quality score, and the facial image based emotional quality score to generate a composite emotional quality score as the emotional quality score.

26. The method of claim 14, wherein executing the classroom analysis machine relative to the classroom observation video from the classroom environment to generate an emotional quality score comprises:

dividing the classroom observation video into subunits, each subunit having an associated time value;

generating a subunit quality score for each subunit based upon at least one of a video characteristic, an audio characteristic, and a facial image characteristic associated with the subunit;

generating a one-dimensional time series of subunit quality scores associated with the classroom observation video;

comparing the one-dimensional time series of subunit quality scores with a threshold value; and identifying at least one series of subunits as relating to a key element when a corresponding set of one-dimensional time series of subunit quality scores one of meets and exceeds the threshold value.

\* \* \* \* \*